Aug. 14, 1934.   R. B. DAY   1,970,281
TREATMENT OF HYDROCARBON OILS
Filed Feb. 5, 1932
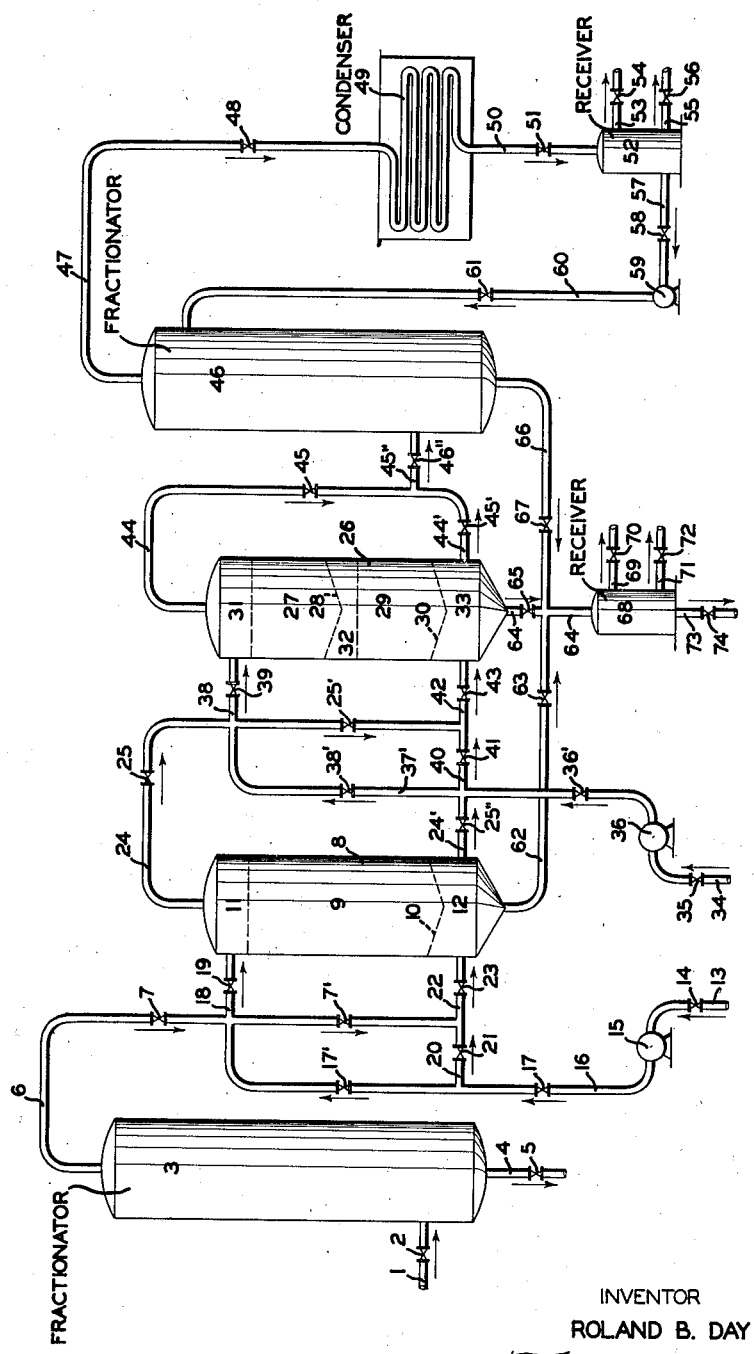
INVENTOR
ROLAND B. DAY
BY Frank L. Belknap
ATTORNEY Patented Aug. 14, 1934

1,970,281

UNITED STATES PATENT OFFICE 1,970,281

TREATMENT OF HYDROCARBON OILS

Roland B. Day, Chicago, Ill., assignor to Universal Oil Products Company, Chicago, Ill., a corporation of South Dakota Application February 5, 1932, Serial No. 591,008

8 Claims. (Cl. 196—36)

This invention relates to the treatment of hydrocarbon oils and refers more particularly to the treatment of low boiling distillates produced in the cracking of relatively heavy petroleum fractions although similar distillates produced in cracking other heavy hydrocarbon mixtures or in straight run distilling operations may also be treated.

In a more specific sense the invention is directed to the treatment of such distillates in heated vaporous condition by a process involving a series of steps directed to the successive removal of undesirable components such as gum-forming constituent and sulphur compound.

It is among the aims and objects of the present invention to provide a process for producing finished gasoline by direct treatment of the vapors arising from cracking or distilling operations so that the need for special chemical treatment of the distillates and their rerunning to produce finished end product gasoline is eliminated, such processes commonly used at present in the oil refining industry being expensive in regard to the cost of chemicals such as sulphuric acid, caustic soda and special "sweetening" reagents such as sodium plumbite, and being inefficient from a heat standpoint on account of the necessity for rerunning the treated distillate. Furthermore the ordinary treating methods as now practiced are wasteful in view of the fact that the reagents used are not always selective in their action. For example, if sufficient sulphuric acid is used to desulphurize a cracked distillate to a suitable point, there are frequently undesirable losses due to reaction of the acid with olefinic and aromatic constituents with resultant decrease in knock rating of the gasoline and the development of color which is difficult to remove. The process of the present invention has for a still further object the elimination of the losses due to these wasteful treating methods by providing an improved process which is more selective in removing the undesirable gum-forming and sulphur compounds without affecting the anti-knock constituents.

In one specific embodiment the invention comprises treating hydrocarbon distillates in heated vaporous conditions with hydrochloric acid in contact with metals or metal compounds, further treating the vapors with ammonia in the presence of metals, preferably copper, or metal compounds and fractionating the treated vapors to produce gasoline.

A generally applicable process for the vapor phase treatment of gasolines containing substantial percentages of highly unsaturated or gum-forming compounds comprises adding hydrochloric acid to the vapors under regulated conditions of temperature and pressure and then contacting the mixture with solid contact materials comprising metals, metal alloys, etc., this treatment resulting in the polymerization of di and tri olefins to form high boiling compounds which are easily removed in the final fractionating step. This treatment, however, has a relatively minor effect upon the sulphur compounds in the vapors compared to the improvement disclosed herein so that when the sulphur content is high it is frequently necessary to subject the vapors or the condensed distillates to further treatment to reduce the sulphur percentage to a desired minimum.

If ammonia is now added to the vapors after such a treatment and the neutralized vapors are further contacted with selected metals it is possible to effect a substantial desulphurization of the vapors and also the removal of substantially all of the chlorine which may have become fixed as a result of the primary treating step as well as to sweeten the resulting product.

The nature and details of the process may be conveniently described with reference to the attached drawing which shows diagrammatically in side elevation and by the use of conventional figures the arrangement of equipment in a plant adapted to perform the functions of the process.

Referring to the drawing the principal parts of the plant will be seen to be a fractionator 3 which produces the vapors to be treated by the process, and which may be of a cracking or straight run distillation plant, a primary treater 8, a secondary treater 26 and a final fractionator 46.

Line 1 containing control valve 2 indicates an inlet for vapors to be subjected to primary fractionation in a fractionator 3 to produce vapors of approximate gasoline boiling point range, a line 4 containing a valve control 5 being indicated as a means for drawing off refluxes which may be returned to the cracking or distilling zone if desired. The vapors to be treated by the process are evolved through a line 6 containing a control valve 7 and may be subjected to the primary or polymerizing treatment in primary treater 8 by being mixed with regulated amounts of hydrochloric acid and passed upwardly or downwardly through a metallic contact mass. If downflow treatment is used the vapors may be admitted to the upper vapor space 11 of treater 8 above the contact mass through a line 18 containing control valve 19 and pass downwardly therethrough, the solid contact mass 9 being supported on a perforated false bottom 10 above the lower vapor space 12. Hydrochloric acid either as a dry gas or in aqueous solution may be injected into line 18 from line 16 containing valves 17 and 17', a positive pressure being produced in this line by pump 15 which receives hydrochloric acid through suction line 13 containing control valve 14 from a source of supply not shown in the drawing.

Such downflow treatments will result in negligible fractionation and if more fractionation is desired or upflow treatment is proven more advantageous for any reason, the vapors from line 6 may be passed through valve 7' with valve 19 closed and enter lower vapor space 12 of treater 8 through line 22 containing control valve 23. The necessary amounts of hydrochloric acid in this case may be admitted to line 22 from branch line 20 containing control valve 21, valve 17' being closed.

Of the contact materials utilizable in the first stage of the treatment copper, zinc and their alloys as well as other alloys of electronegative and electropositive metals may be mentioned. The amounts of hydrochloric acid used will depend upon the composition of the vapors and the extent of treatment desired. In general, however, amounts of from 0.2 to 0.75 lbs. of hydrochloric acid per bbl. of finished gasoline will be ample.

In the case of downflow treatments, the vapors from the lower vapor space may be released through a line 24' containing a valve 25" and in the case of upflow treatments, through a line 24 containing control valve 25. Heavy refluxes containing polymers and heavy reaction products may be passed through a line 62 containing a control valve 63 to a receiver 68 whose function will be described later.

In treater 26 provision is preferably made for utilizing different contact masses successively. In general one contact mass may be utilized for desulfurizing reactions and the other for dechlorinating reactions, the order of application being a matter of trial and not essential to the invention. Thus treater 26 is shown to contain an upper contact mass 27 supported on a perforated conical plate 28 and lower contact mass 29 similarly supported on a perforated plate 30. The masses indicated divide the remaining treater space into vapor spaces 31, 32 and 33.

As already indicated the characteristic feature of the second stage of the process is the addition of regulated amounts of ammonia which has been found to facilitate the further treatment of the vapors for chlorine and sulphur removal. The exact reason for this result is not know but experiments have successively proven that substantial desulfurizing and dechlorinating effects are made possible by its use which would not be possible otherwise. The addition of ammonia further serves to neutralize the vapors and prevent any possible corrosion of equipment. Granulated zinc has been found to be the most effective agent for the removal of chlorine fixed in the first treating stage and its use as one contact mass in treater 26 is therefore preferred though other metals of a similar nature such as cadmium and certain mercury and lead amalgams may also be used. For the desulfurizing step, copper has given good results as well as brass and other metals and metal alloys of like character. It is further preferred to use granulated copper, or brass or bronze turnings, as the other contact mass.

The arrangements for upward and downflow and for the admission of treating reagent are in general similar to those described in connection with treater 8. Vapors from line 24 may be conducted to upper vapor space 31 through a line 38 containing a control valve 39, ammonia having been added to line 38 from line 37' through valve 38' as will be presently more fully described. If upflow treatments are proven best in any particular case the vapors may be passed to lower vapor space 33 through valve 25', line 42 and valve 43, with valve 39 closed. In this case ammonia in proper amounts may be admitted to line 42 from line 40 containing control valve 41 and branching from ammonia header 37'. Ammonia may be supplied to a pump 36 from a line 34 containing a control valve 35 and discharged into line 37' containing control valve 36' to supply the needs of the treater. The ammonia may be pumped in as a dry gas or as an aqueous solution or may be admitted from cylinders under pressure in which case the pump will not be necessary.

The amount of ammonia required is generally not large and it only need be used in sufficient quantity to neutralize the hydrochloric acid originally used and to react with the free hydrogen sulphide and mercaptans in the vapors though frequently a slight excess of that required for these reactions is advantageous. Thus the range of from ½ to 2 lbs. per bbl., would generally include any amount of ammonia which might be necessary.

The vapors from upflow treatments in treater 26 may be conducted through line 44 containing control valve 45 and pass through line 45" containing valve 46" to final fractionator 46. Similarly vapors from downflow treatments may be conducted through a line 44' containing a valve 45'. Refluxes accumulating in secondary treater 26 may be withdrawn through a line 64 containing control valve 65 and pass to receiver 68 along with refluxes from the primary treater from line 62 and refluxes from fractionator 46 from line 66 containing control valve 67. In case aqueous solutions have been used in either treater 8 or treater 26, the refluxes from the treater and the final fractionator may contain a certain amount of aqueous solutions of reaction products, these being disposed of through a bottom draw 73 containing control valve 74 and either regenerated or disposed of as waste material. Receiver 68 is also provided with gas release line 69 containing a control valve 70 and an oil draw line 71 containing control valve 72 for the removal of polymer refluxes which may then be returned to the distilling or cracking zones which furnish the original vapors for treatment.

Vapors from fractionator 46 may be conducted through a line 47 containing control valve 48 and condensed by condenser 49, substantially finished gasoline and cooled gases then being led through a line 50 containing control valve 51 to final receiver 52 which has the usual gas release line 53 containing control valve 54 and a liquid draw line 55 containing a control valve 56 for finished gasoline. To assist in controlling the boiling point range of the vapors of the fractionator the proper portions of the liquid product may be returned to the top of the tower, and for this purpose a recirculating pump 59 may be provided which takes suction through line 57 containing control valve 58 and discharges through 15 a line 60 containing control valve 61 and leading to the top of the fractionator.

In general the temperatures employed in the various stages of the process will be those inherent in the vapors to be treated under the pressure at which they are produced. In the case of straight run distilling operations which are usually conducted at atmospheric or low superatmospheric pressures, the range of vapor temperature may be comprised within approximately 200 to 400° F. while in vapors arising from cracking operations the temperature may be higher, say, within the range of 250 to 600° F. In case all or part of the pressure of the cracking plant is utilized in the treating and final fractionating stages. Superheating may be resorted to in case higher temperatures are required or if it appears advantageous to avoid the condensation of liquids in any treating stage.

Of the numerous examples of the results obtainable by the operation of the process, the following has been selected as characteristic. The vapors treated may be produced from cracking of an equally proportioned mixture of West Texas and Mid-Continent topped crudes, operating at approximately 925° F. and 250 lbs. pressure in the cracking zone. The fractionators of the cracking plant may produce gasoline vapors having the properties shown in the column headed "Untreated." After utilizing hydrochloric acid in the amount of ½ lb. per bbl. of finished gasoline and passing the vapors downwardly over a stationary mass of brass turnings, the condensed gasoline may be found to have the properties shown in the column headed "After First Stage." By further adding ammonia in an amount equivalent to approximately 1 lb. per barrel of gasoline and contacting the vapors successively with zinc and copper contact masses using upflow treatment, the gasoline produced by the process may then have the properties shown in the column headed "After Second Stage."

|  | Untreated | After first stage | After second stage |
|---|---|---|---|
| Gr. °A.P.I. | 55.2 | 55.3 | 55.5 |
| End point | 410 | 410 | 408 |
| Color, Saybolt | 12 | 29 | +30 |
| Doctor test | Bad. | Positive. | Negative. |
| Mg. gums/100 cc | 375 | 30 | 20 |
| Total sulphur, % | 0.18 | 0.15 | 0.10 |
| Total chlorine, % | 0 | 0.06 | 0.01 |

The tabulation shows readily the progressive improvement in properties as the steps of the treatment are applied. Between the first and second stage of treatment the reaction with doctor solution changes from positive to negative, the gums drop slightly, the total sulphur content drops materially and the chlorine fixed in the first stage of the treatment is finally reduced to a negligible quantity. Thus it will be seen that two-stage treatment possesses distinct advantages over the single stage treatment as previously disclosed although in cases involving the treatment of stocks lower in sulphur the single stage treatment may be sufficient to accomplish necessary treating effects.

The specification and examples given have sufficiently disclosed the nature of the invention to make its advantages evident to those skilled in the art to which it pertains, but since the description of the operation in connection with the drawing and the single numerical example are given for illustrative purposes only, neither is to be construed as imposing limitations upon the generally broad scope of the invention.

I claim as my invention:

1. A process for the treatment of cracked hydrocarbons for the purpose of removing gums, color and other objectionable materials and to refine the same which comprises subjecting the said hydrocarbons, while in heated vaporous condition, to the action of hydrochloric acid in the presence of a metal and thereafter subjecting the hydrocarbons while still in heated vaporous condition to the action of ammonia and a metal selected from the group consisting of zinc, cadmium, mercury, lead and copper.

2. A process for the treatment of cracked hydrocarbons for the purpose of removing gums, color and other objectionable materials and to refine the same which comprises subjecting the said hydrocarbons, while in heated vaporous condition, to the action of hydrochloric acid in the presence of a copper bearing metal and thereafter subjecting the hydrocarbons while still in heated vaporous condition to the action of ammonia and a copper bearing metal.

3. A process for the treatment of cracked hydrocarbons for the purpose of removing gums, color and other objectionable materials and to refine the same which comprises subjecting the said hydrocarbons, while in heated vaporous condition, to the action of hydrochloric acid in the presence of a zinc bearing metal and thereafter subjecting the hydrocarbons while still in heated vaporous condition to the action of ammonia and a zinc bearing metal.

4. A process for the treatment of cracked hydrocarbons for the purpose of removing gums, color and other objectionable materials and to refine the same which comprises subjecting the said hydrocarbons, while in heated vaporous condition, to the action of hydrochloric acid in the presence of brass and thereafter subjecting the hydrocarbons while still in heated vaporous condition to the action of ammonia and brass.

5. In the refining of hydrocarbon oils, the step which comprises treating the oil with ammonia in the presence of a metal selected from the group consisting of zinc, cadmium, mercury, lead and copper.

6. In the refining of hydrocarbon oils, the step which comprises treating the oil with ammonia in the presence of zinc.

7. In the refining of hydrocarbon oils, the step which comprises treating the oil with ammonia in the presence of copper.

8. In the refining of hydrocarbon oils, the step which comprises treating the oil with ammonia in the presence of brass.

ROLAND B. DAY.